UNITED STATES PATENT OFFICE.

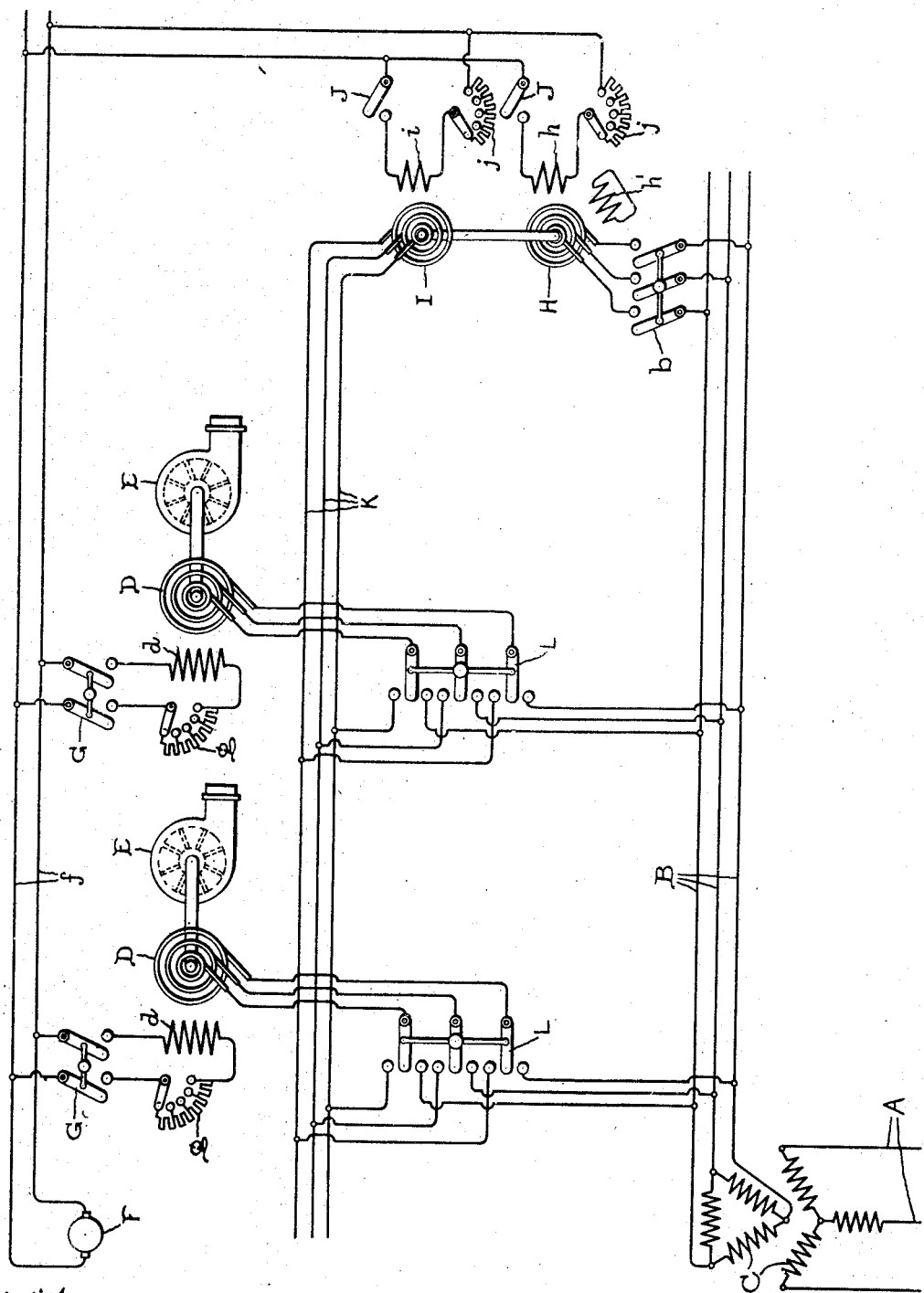

WILLIAM J. FOSTER, OF SCHENECTADY, NEW YORK, ASSIGNOR TO GENERAL ELECTRIC COMPANY, A CORPORATION OF NEW YORK.

MEANS FOR STARTING ALTERNATING-CURRENT MOTORS.

955,455.  Specification of Letters Patent.  Patented Apr. 19, 1910.

Application filed November 3, 1908. Serial No. 460,913.

*To all whom it may concern:*

Be it known that I, WILLIAM J. FOSTER, a citizen of the United States, residing at Schenectady, county of Schenectady, State of New York, have invented certain new and useful Improvements in Means for Starting Alternating-Current Motors, of which the following is a specification.

My invention relates to means for starting large alternating-current motors without drawing an excessive current from the supply circuit.

My invention is particularly adapted for use in connection with motors which are operated at the end of a long transmission line, and which, if thrown directly on the line, would pull down the line voltage at starting, to the detriment of other devices supplied from the line.

My invention consists in providing a small motor-generator set, comprising two synchronous machines of the same frequency, with means for connecting the motor of the set to the supply circuit and means for connecting the main motor first to the generator of the set and then to the supply circuit. The motor of the set may be especially designed for starting with small current, while the generator may be especially designed to furnish the large currents at low power-factor, which are taken by a large alternating-current motor at starting. By such an arrangement the main motor may be started through the set without drawing from the line more than half the current required when starting by the usual means, then when it is up to speed and excited, it may be thrown onto the transmission line without disturbing the line-voltage, and the small motor-generator set may then be cut out.

My invention will best be understood by reference to the accompanying drawing, which shows diagrammatically a pair of large synchronous motors provided with an auxiliary motor-generator set for starting arranged in accordance with my invention.

In the drawing A represents the receiving end of a transmission line from which the bus-bars B are supplied through the step-down transformers C.

D D represent a pair of large alternating-current motors, which are shown diagrammatically as of the synchronous type, and which drive any suitable load, as, for instance, the centrifugal pumps E E. The field windings of the motors are shown at $d\ d$. The field windings are excited from the bus-bars $f$ supplied from the exciter F, and are provided with the usual switch G and field rheostat $g$.

H and I represent the motor and generator respectively of a small motor-generator set, the two machines being of the same frequency. The fields of the two machines are indicated at $h$ and $i$, and are provided with field switches J and field rheostats $j$. The motor H is provided with a short-circuited winding $h'$ for starting and is designed for starting with a small current. This may be accomplished by designing the motor with a small air-gap, so as to obtain a high coefficient of mutual induction between the armature winding and the short-circuited winding $h'$, and designing the winding $h'$ with a suitable resistance. By thus properly designing the motor, it may be started on small current simply by connecting the armature to the bus-bars B through switch $b$. The generator I is designed to furnish large currents at low-power factor,—that is, the generator has a large air-gap, as compared with that of the motor H, so that the armature reaction is relatively low. This generator is connected to the bus-bars K. Double-throw switches L are provided for connecting the main motors D either to the bus-bars K or to the bus-bars B.

The manipulation at starting is as follows: With the field circuits of all the machines open, the small motor H is thrown onto the bus-bars B by closing the switch $b$. Owing to the special design of this small motor, it starts with small current, and therefore without seriously pulling down the line-voltage. When the small motor H is up to speed, its field switch J is closed and the rheostat $j$ adjusted to give the motor its proper excitation. The field switch J of the generator I is then closed with all of the field resistance $j$ in circuit, so that this generator supplies a low-voltage to the bus-bars K. One of the switches L is then thrown so as to connect the corresponding motor D to the bus-bars K. The main motor thereupon starts and in starting draws a large current at low voltage and low power-factor from the generator I, but the current which is drawn by the motor H from the bus-bars B is at normal voltage and high power-factor, and therefore not large. After the main motor D is started the resistance $j$ is gradually cut out of the field circuit of the generator I, so as to bring the voltage impressed on the main motor up to normal. The main motor is then excited by closing its field switch G and adjusting its field rheostat $g$ until the field excitation is brought to the proper strength. Since the motor H and generator I are on the same frequency, the main motor D is now running in synchronism with the line-voltage, and may consequently be thrown onto the line, by throwing the switch L to its other position, without disturbing the line voltage. It will be understood that the main motor D is started light with the load thrown off. In the case of a pump this is commonly done by proper manipulation of the valves, as is well-understood in the art. After the motor is up to speed and connected to the bus-bars B the load is gradually thrown on.

What I claim as new and desire to secure by Letters Patent of the United States, is:—

1. In combination with a main alternating-current motor and its supply circuit, a small motor-generator set comprising two synchronous machines of the same frequency, means for connecting the motor of said set to the supply circuit, and means for connecting the main motor first to the generator of said set and then to the supply circuit.

2. In combination with a main alternating-current motor and its supply circuit, a small motor-generator set comprising two synchronous machines of the same frequency, the motor being designed for starting with small input and the generator being designed to furnish large currents at low power factor, means for connecting the motor of said set to the supply circuit, and means for connecting the main motor first to the generator of said set and then to the supply circuit.

3. In combination with a main alternating-current motor and its supply circuit, a small motor-generator set comprising two synchronous machines of the same frequency, the motor of the set having a small air-gap as compared with the generator, means for connecting the motor of the set to the supply circuit, and means for connecting the main motor first to the generator of said set and then to the supply circuit.

In witness whereof, I have hereunto set my hand this 31st day of October, 1908.

WILLIAM J. FOSTER.

Witnesses:
BENJAMIN B. HULL,
HELEN ORFORD.